United States Patent
Busley et al.

(10) Patent No.: US 8,113,592 B2
(45) Date of Patent: Feb. 14, 2012

(54) AUTOMOTIVE CONSTRUCTION ENGINE AND LIFTING COLUMN FOR A CONTRUCTION ENGINE

(75) Inventors: Peter Busley, Linz/Rhein (DE); Günter Tewes, Unkel/Rhein (DE)

(73) Assignee: Wirtgen GmbH (DE)

( * ) Notice: Subject to any disclaimer, the term of this patent is extended or adjusted under 35 U.S.C. 154(b) by 688 days.

(21) Appl. No.: 11/991,846

(22) PCT Filed: Sep. 12, 2006

(86) PCT No.: PCT/EP2006/066305
§ 371 (c)(1),
(2), (4) Date: Mar. 12, 2008

(87) PCT Pub. No.: WO2007/031531
PCT Pub. Date: Mar. 22, 2007

(65) Prior Publication Data
US 2010/0109422 A1 May 6, 2010

(30) Foreign Application Priority Data

Sep. 12, 2005 (DE) .......................... 10 2005 043 531
Sep. 15, 2005 (DE) .......................... 10 2005 044 211

(51) Int. Cl.
*E01C 23/12* (2006.01)
*B60S 9/00* (2006.01)
(52) U.S. Cl. ....................... 299/39.6; 404/90; 280/6.157
(58) Field of Classification Search ................ 299/39.4, 299/39.6, 1.5, 39.1; 404/90–94; 280/6.155, 280/43, 43.17, 6.157, 5.514; 33/483, 809–811, 33/1 LE, 756
See application file for complete search history.

(56) References Cited

U.S. PATENT DOCUMENTS

| 3,946,506 | A |   | 3/1976 | Snow, Jr. et al. |
| 4,213,719 | A | * | 7/1980 | Swisher et al. ............. 404/84.2 |
| 4,247,126 | A |   | 1/1981 | Claxton |
| 4,270,801 | A | * | 6/1981 | Swisher et al. .............. 299/1.5 |
| 4,808,026 | A | * | 2/1989 | Clarke et al. .................. 404/90 |
| 4,943,119 | A | * | 7/1990 | Zarniko et al. ............... 299/1.5 |
| 5,893,677 | A | * | 4/1999 | Haehn et al. .................. 404/90 |
| 5,984,420 | A | * | 11/1999 | Murray et al. ................ 299/1.5 |
| 6,152,648 | A | * | 11/2000 | Gfroerer et al. .......... 404/84.05 |
| 2002/0047301 | A1 | * | 4/2002 | Davis ............................ 299/1.5 |
| 2005/0077691 | A1 | * | 4/2005 | Witters ..................... 280/5.514 |

(Continued)

FOREIGN PATENT DOCUMENTS

CA 2 548 521 6/2005

(Continued)

*Primary Examiner* — Sunil Singh
(74) *Attorney, Agent, or Firm* — Waddey & Patterson, P.C.; Lucian Wayne Beavers

(57) ABSTRACT

A road construction machine includes a machine frame, a working drum and a plurality of ground engaging supports. A plurality of lifting columns are connected between the machine frame and the ground engaging supports. Each of the lifting columns include two telescoping hollow cylinders. A plurality of lifting position measuring devices are provided, each measuring device being coupled with elements of one of the lifting columns, which elements are capable of being displaced relative to one another in accordance with the lifting position of the lifting column in such a manner that a path signal pertaining to a lifting position of the lifting column is continuously detectable by the measuring device. A controller is operably connected to the lifting position measuring devices to receive the path signals and to regulate the lifting positions of the lifting columns in response to the path signals.

22 Claims, 3 Drawing Sheets

U.S. PATENT DOCUMENTS

| | | | |
|---|---|---|---|
| 2006/0076821 A1* | 4/2006 | Troudt et al. | 299/39.2 |
| 2008/0246328 A1* | 10/2008 | Mannebach et al. | 299/39.6 |
| 2008/0315666 A1* | 12/2008 | Von Schonebeck et al. | 299/39.6 |
| 2009/0108663 A1* | 4/2009 | Berning et al. | 299/1.5 |

FOREIGN PATENT DOCUMENTS

| | | |
|---|---|---|
| DE | 38 12 809 A1 | 11/1989 |
| DE | 196 17 442 C1 | 1/1998 |
| DE | 103 57 074 B3 | 5/2005 |
| EP | 1 154 075 A2 | 11/2001 |
| GB | 2 313 347 A | 11/1997 |
| JP | 02279805 A * | 11/1990 |
| WO | WO 93 08003 | 4/1993 |
| WO | WO 02057112 A1 * | 7/2002 |

* cited by examiner

AUTOMOTIVE CONSTRUCTION ENGINE AND LIFTING COLUMN FOR A CONTRUCTION ENGINE

BACKGROUND OF THE INVENTION

The invention relates to an automotive construction machine as well as a lifting column for a construction machine.

Such construction machinery is known, for instance, from DE 103 57 074 B3. The said construction machine shows a machine frame that is supported by a chassis, as well as a working drum that is mounted at the machine frame in an immovable and/or pivotable manner, and is used for working a ground surface or traffic surface. The chassis is provided with wheels and/or crawler track units which are connected to the machine frame via lifting columns and are individually adjustable in height relative to the machine frame.

The adjustment in height is made possible by a controller that raises or lowers the lifting columns by controlling the hydraulic input or hydraulic discharge of piston cylinder units in the lifting columns.

The construction machine described in DE 103 57 074 B3 is a recycler, and the disclosure of this publication is included in the present application to the extent that it is related to recyclers.

A chassis for a machine used for milling carriageway pavements is known from DE 196 17 442 C1, the front axle of the said chassis being, for instance, adjustable in height in the manner of a full-floating axle. The lifting columns of the chassis are capable of being raised or lowered respectively in a reciprocally opposed manner. The disclosure of this publication is also included by reference into the present application.

A known construction machine of the applicant is the recycler WR 2000, the wheels of which are connected to the machine frame via lifting columns that are adjustable in height hydraulically. Each wheel is driven by an own hydraulic motor. The known construction machine is equipped with all-wheel steering, with the front and/or the rear wheels being capable of acting as the steered axle.

It is understood that the present application is not limited to wheel-driven construction machines, but also includes such construction machines that are provided with crawler track units or a mixture of wheels and crawler track units.

In the known construction machines, the lifting columns are adjusted manually via switchover valves, with sensors detecting that the piston of the piston cylinder unit adjusting the lifting column has reached pre-determined positions. The sensors may detect, for instance, the upper edge of the piston in the piston cylinder unit. A first sensor detects the position of the piston in an operating position for milling, and a further sensor detects the position of the piston in a transport position. In operating position, the machine frame therefore always has the same, pre-determined distance from the ground surface. When the piston has left the pre-defined sensor positions, the information about the position of the machine is lost. It is, in particular, not possible to adjust any other operating positions in a flexible manner without remounting the position sensors. It is not even possible to, for instance, adjust an operating position that is parallel to the pre-adjusted operating position but deviates from the same in height. What is more, it is not possible to adjust a defined transverse inclination or any other practical position of the machine frame or the machine respectively without cumbersome remounting efforts.

This creates the additional problem that the machine frame can adopt a different distance to the ground surface or traffic surface because of different loads or load distributions which are due to, for instance, a different filling level of the fuel tank or a water tank.

In case of wheels, deviations additionally result because of the filling pressure, the temperature and the interaction of the relatively soft wheel with the ground surface or traffic surface, which may, for instance, cause an alteration in distance of several centimetres. These alterations in distance of the machine frame relative to the ground surface require the position of the sensors to be displaced. Even though it is also possible to unlock the sensor for the operating position and to override this lifting position, the disadvantage results that the piston, at its front surfaces, touches the respective front surfaces of the cylinder when the mechanical limit stop of the piston cylinder unit has been reached, which may cause the piston of the piston cylinder unit to turn loose when carrying out steering movements of the wheels.

The purpose of the invention is to avoid the aforementioned disadvantages and to enable the vehicle driver to select any given lifting position of the lifting columns as operating position in particular for the working operation.

The invention provides in an advantageous manner that each individual height-adjustable lifting column is provided with a measuring device for measuring the current lifting state of the lifting column, the lifting columns comprise two hollow cylinders capable of telescoping which serve as guiding unit and accommodate at least one piston cylinder unit for height adjustment, preferably in a coaxial manner, on their inside, that each individual height-adjustable lifting column is provided with a measuring device for measuring the current lifting state of the lifting column, the measuring device is coupled with elements of the lifting column, which are adjustable relative to one another in accordance with the lifting position, in such a manner that a path signal pertaining to the lifting position of each lifting column is continuously detectable by the measuring device, and that a controller receiving the measured path signals from the measuring devices of all the lifting columns regulates the lifting state of the lifting columns in accordance with the measured path signals of the measuring devices and/or their alteration over time.

The invention provides in an advantageous manner for pre-selectable positions of the lifting columns to be adjusted in a regulated manner, permitting the use of the measured path signal, and of the velocity and acceleration signals which can be deduced therefrom. Recording of the measured values enables the lifting state of the lifting columns to be regulated automatically. A controller receiving the measured signals from the measuring device can adjust a desired lifting position of the lifting columns in a regulated manner without overshooting or with as little overshooting as possible in accordance with the measured signals of the measuring device and/or their alteration over time.

The measured signals may be suitable for supplying to an indicator device for the lifting position of the lifting columns. Because the vehicle driver receives information on the current lifting state of each lifting column via the indicator device, it is possible to adjust and define as operating position a freely selectable position of the machine frame without the need for limit switches or sensors to be displaced. Hence, the vehicle driver has the possibility to equalize different load situations that may arise due to, for instance, a different filling level of the fuel tank or the water tank. Furthermore, influences of the relatively soft wheels due to different temperatures, a different filling pressure or because of the interactions with the ground can be equalized individually for each wheel or crawler track unit.

The measuring device for the lifting position preferably includes a path measuring device, and all known path measuring systems like, for instance, capacitive, inductive, mechanical path measuring systems or laser measuring systems may be used.

The lifting columns comprise two hollow cylinders capable of telescoping which serve as guiding unit and accommodate at least one piston cylinder unit, preferably in a coaxial manner, on their inside.

A preferred path measuring device includes at least one wire-rope that is coupled with the elements of a lifting column, and one wire-rope sensor.

A wire-rope that is under tension and capable of being rolled up is coupled with elements of the lifting column, which are capable of being displaced relative to one another in accordance with the lifting position, in such a manner that a path signal pertaining to the lifting position of each lifting column is detectable continuously. The path signal transmitted to the indicator device may be used for manual control of the height adjustment by the vehicle driver with the aid of the indicator device, but also for automatic control or regulation.

The construction machine can be adjusted to a reference plane, where a desired spatial position like, for instance, a parallel position of the machine frame to the ground surface or traffic surface can be stored on the reference plane by storing the current measured signals of the measuring device in accordance with the current lifting positions of the lifting columns as a reference lifting position of the chassis.

By means of the reference plane, which is preferably a horizontal plane, the vehicle driver can bring the machine frame into a specific position which he can define as the reference lifting position. In case of a level machine frame, the said machine frame could, for instance, be brought into a precisely horizontal position which, with a pre-determined distance from the ground or the traffic surface, could be defined as the reference lifting position of the lifting columns. The vehicle driver can recognize the said reference lifting position by means of the indicator device and can approach it specifically as and when required. On the other hand, it is also possible to raise or to lower individual lifting columns or a combination of lifting columns by a specific amount. The vehicle driver can, for instance, also adjust an operating position which deviates from the reference lifting position by a specific amount, e.g. 100 mm, or a specific transverse inclination or a plane in space arbitrarily defined by the vehicle driver.

In a preferred embodiment, it is provided that at least one limiting value for the height adjustment monitored by the measuring device is adjustable for each lifting column, the said limiting value limiting the lowest and/or highest lifting position of a lifting column to a pre-determined position. It is thus ensured that the piston cylinder unit provided on the inside of a lifting column will not run up against its corresponding mechanical limit stops, as the piston cylinder unit may be damaged or may turn loose from the lifting column in these mechanical end positions, in particular in case of steering angles.

Consequently, it is provided that the lowest or highest lifting position in the direction of movement is positioned in front of the mechanical limit stop of the piston against the cylinder of the piston cylinder unit.

Recording of the measured values enables a controller, which receives the measured signals from the measuring devices, to regulate the lifting state of the lifting columns automatically in such a manner that the machine frame is subject to the smallest possible displacement due to the structure of the ground surface or traffic surface.

Alternatively, it is also possible for the controller to regulate the lifting state of the lifting columns by means of the measured signals in such a manner that the machine frame is subject to the smallest possible transverse inclination or transverse oscillation transverse to the direction of travel due to the existing structure of the ground surface or traffic surface.

It may additionally be provided that, when altering the lifting state of one wheel or crawler track unit, a neighbouring wheel or crawler track unit in transverse direction or longitudinal direction of the machine frame is adjustable in height in an opposite manner. Controlling of the lifting state may be effected, for instance, in accordance with the hydraulic method described in DE 196 17 442 C1. In case of a hydraulic forced coupling of neighbouring lifting columns, one single measuring device for both lifting columns is sufficient due to the identical amount of stroke adjustment.

There is, however, also the possibility of controlling the lifting state of each wheel purely electronically in the manner of a full-floating axle. With such a full-floating control, an additional stroke adjustment can be overridden by the vehicle driver.

With the reciprocal control of the lifting state, the neighbouring wheels or crawler track units are preferably adjusted in height by the same amount and in an opposite manner.

In case of a cold milling machine, the rear wheels or crawler track units when seen in the direction of travel are preferably adjustable in height in the manner of a full-floating axle by the same amount and in opposite direction.

In case of a recycler, the wheels or crawler track units arranged behind one another on one side of the machine when seen in the direction of travel may be adjustable in height in the manner of a full-floating axle by the same amount and in opposite direction.

A controller receiving the measured signals from the measuring devices can adjust a desired lifting position of the lifting columns without overshooting or with as little overshooting as possible in accordance with the measured signals from the measuring devices and/or their alteration over time.

The measured signals from the measuring devices may be calibrated to a unit of length, so that a specified stroke amount can be entered in millimetres for the purpose of height adjustment.

The controller may regulate the working depth of the working drum, in which case the controller receives the measured path signals from the measuring device and includes them into the regulation of the working depth of the working drum.

Each lifting column is provided at the lower end with a support for the wheel or crawler track unit, where a distance sensor measures the distance of the support to the ground surface and traffic surface, preferably in a pre-determined distance in front of or next to the wheel or crawler track unit, and transmits a measured signal to a controller for the lifting position of the lifting columns, and/or to a controller for the working depth of the working drum, and/or to the indicator device.

BRIEF DESCRIPTION OF THE SEVERAL VIEWS OF THE DRAWINGS

In the following, embodiments of the invention are explained in more detail with reference to the drawings. The following is shown.

DETAILED DESCRIPTION OF THE INVENTION

Figure 1:
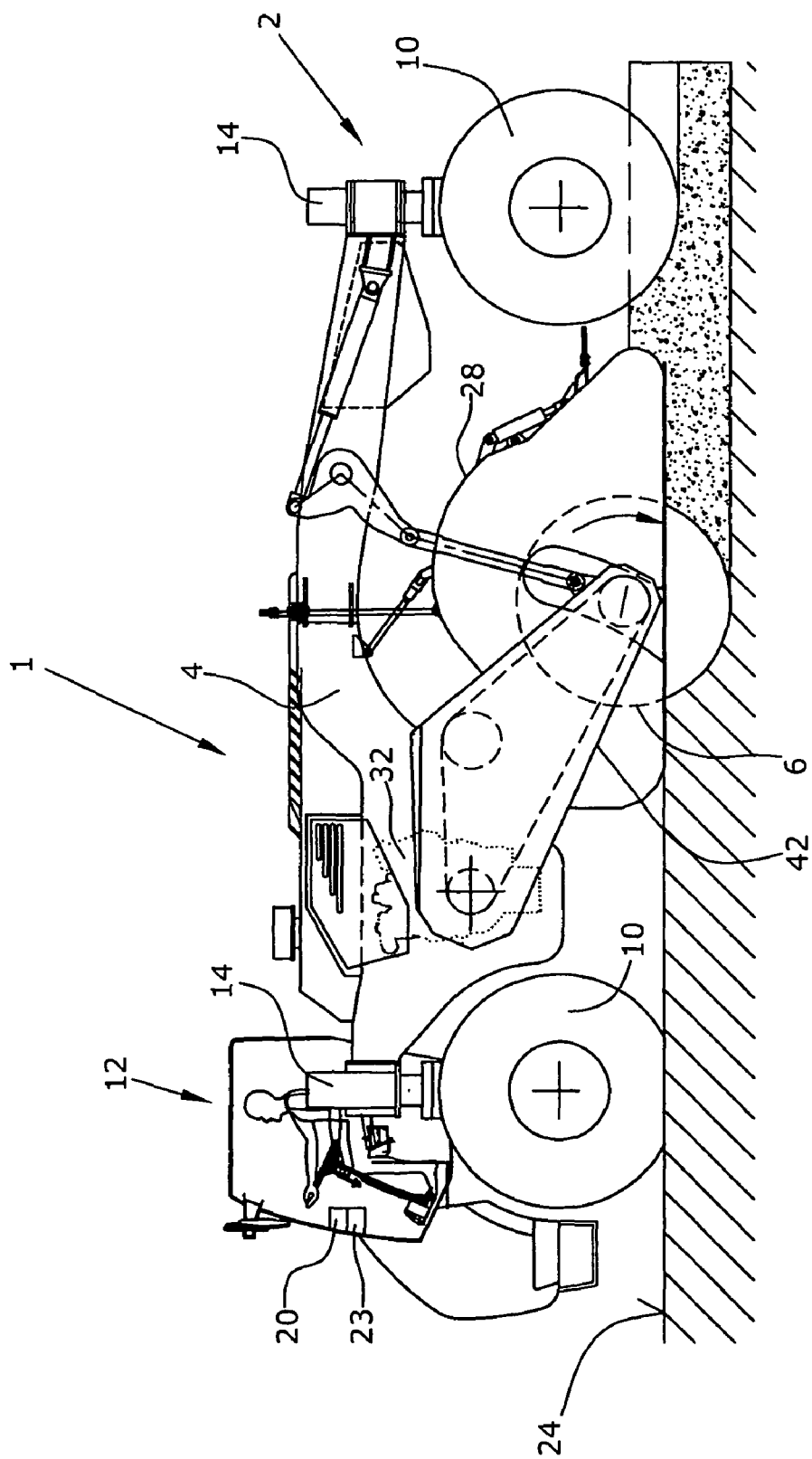
FIG. 1 is a side view of the construction machine in accordance with the invention, in which the working drum is in a working position, FIG. 2 a top view of the construction machine in accordance with FIG. 1, and FIG. 3 a lifting column of the construction machine.

FIG. 1 shows a road construction machine 1 for producing and working carriageways by stabilizing insufficiently stable soils or by recycling road surfaces, with a machine frame 4 supported by a chassis 2, as it is basically known from DE 103 57 074 B3. The chassis 2 is provided with two each rear and front wheels 10, which are attached to lifting columns 14 in a height-adjustable manner and can be raised and lowered independently of one another or also synchronously to one another. It is understood that other drive means like, for instance, crawler track units may also be provide in lieu of the wheels 10. The wheels or crawler track units may also be referred to as ground engaging supports for supporting the construction machine on the ground surface or traffic surface 24. The lifting columns 14 are attached to the machine frame 4.

Both axles of the chassis, which are formed by the front and rear wheels 10 respectively, may be steerable.

Figure 2:
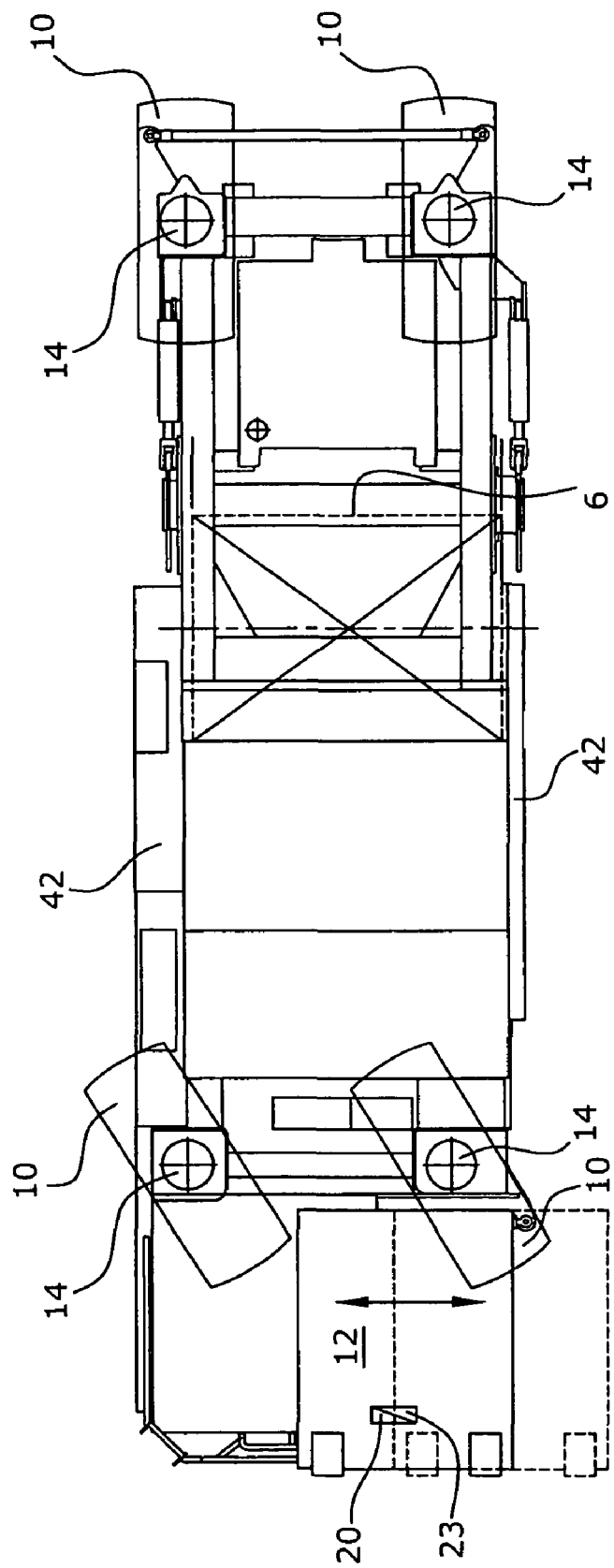

As can be seen from FIGS. 1 and 2, an operator's platform 12 for a vehicle driver is arranged at the machine frame 4 above the front wheels 10 or in front of the front wheels 10, with a combustion engine 32 for the travel drive and for driving a working drum 6 being arranged behind the driver. In this manner, the operator's platform 12 can be ergonomically optimized for the vehicle driver.

The working drum 6 which rotates, for instance, in opposition to the direction of travel when seen in the direction of travel, and the axis of which extends transversely to the direction of travel, is mounted to pivot relative to the machine frame 4 in such a manner that it is capable of being pivoted from an idle position to a working position, as depicted in FIG. 1, by means of pivoting arms 42 arranged on both sides. Each pivoting arm 42 is mounted in the machine frame 4 at one end and accommodates the support of the working drum 6 at its other end.

It is also possible to operate the machine 1 in reversing direction, with the milling operation then taking place synchronously to the direction of travel.

The working drum 6 is, for instance, equipped with cutting tools that are not depicted in the drawings in order to be able to work a ground surface or traffic surface 24.

The working drum 6 is surrounded by a hood 28 which, as can be seen from FIG. 1, is capable of being raised together with the working drum 6 by means of the pivoting arms 42.

In operating position, the hood 28 rests on the ground surface or traffic surface 24 to be worked, as can be seen from FIG. 1, while the working drum 6 is capable of being pivoted further down according to the milling depth.

It is understood that other embodiments of such a construction machine exist in which the hood 28, or the hood 28 and the working drum 6, are mounted at the machine frame 4 in a rigid manner. In the latter case, the working depth of the working drum 6 is adjusted via the lifting columns 14, in all other cases through an adjustment in height of the working drum 6.

Figure 3:
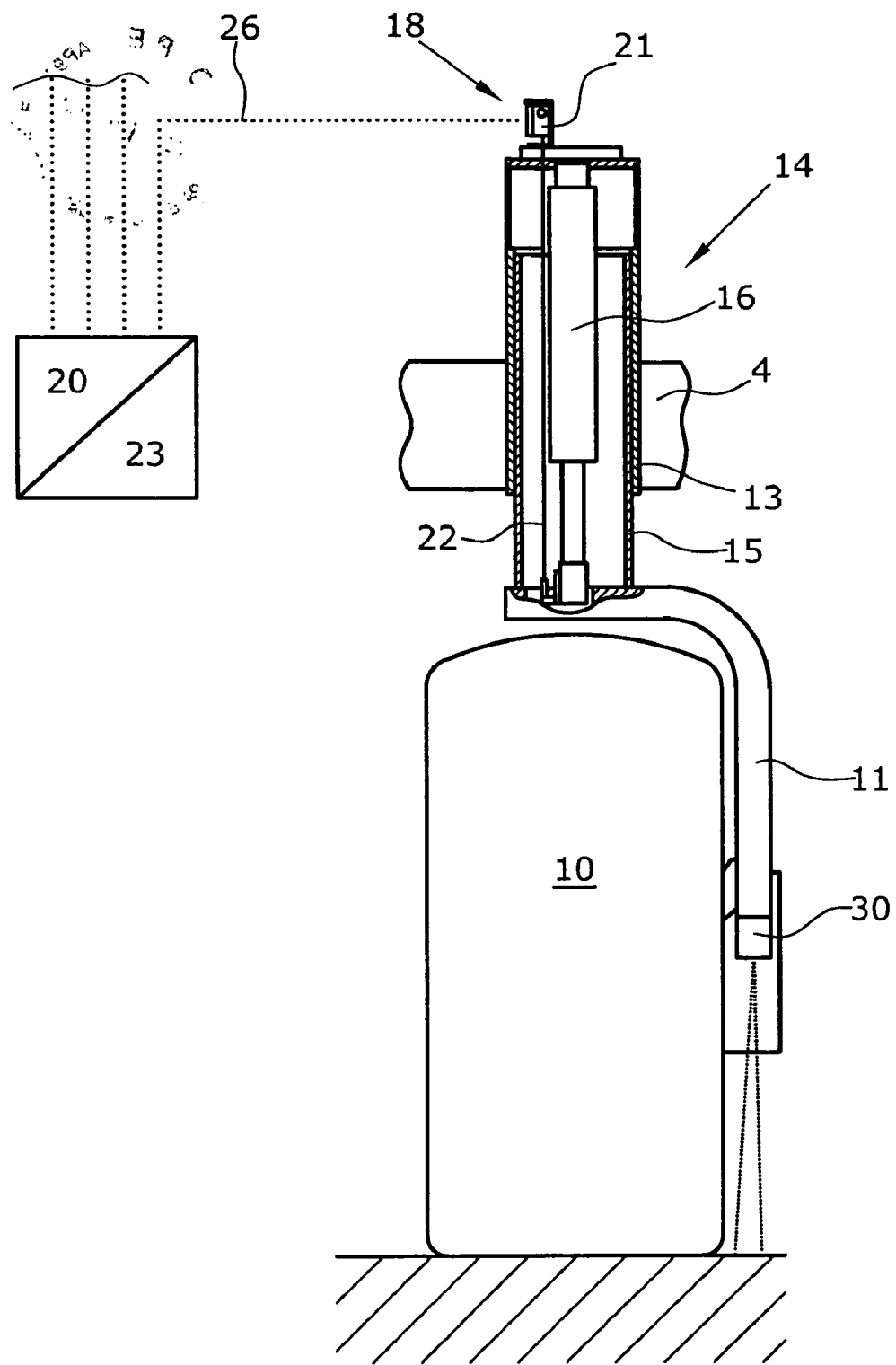

FIG. 3 shows an individual lifting column 14 comprising two hollow cylinders 13, 15 which are capable of telescoping in a form-fitting manner. The hollow cylinders 13, 15 serve as guiding unit for the height adjustment of the machine frame 4. The upper outer hollow cylinder 13 is attached at the machine frame 4, and the lower inner hollow cylinder 15 is attached at a support 11 which may be coupled with a wheel 10 or a crawler track unit. The lifting column 14 is further provided with a hydraulic piston cylinder unit 16 for the stroke adjustment. The piston cylinder unit 16 acts between the machine frame 4 and the support 11, so that the machine frame 4 is capable of being adjusted in height relative to the support 11 and thus, ultimately, relative to the ground surface or the traffic surface 24 respectively. In the embodiment shown in FIG. 3, the piston element of the piston cylinder unit 16 is attached at the support 11, and the cylinder element of the piston cylinder unit 16 is attached at the upper hollow cylinder 13, which is attached at the machine frame 4.

It is understood that more than one piston cylinder unit 16 may also be present in the lifting column 14.

The piston cylinder unit 16 may also be force-coupled hydraulically with a neighbouring lifting column 14, as has been basically described in DE 196 17 442 C1, in order to form a purely hydraulic full-floating axle.

The lifting column 14 is provided with a measuring device 18 for measuring the current lifting state of the lifting column 14. In the embodiment, the said measuring device 18 includes a wire-rope 22 that is attached to the support 11 or the lower hollow cylinder 15 and is, on the other hand, coupled with a wire-rope sensor 21 that is attached at the cylinder element of the piston cylinder unit 16 or at the upper hollow cylinder 13. The stroke path of the lifting column 14 can be measured by means of the wire-rope sensor 21. The wire-rope sensor 21, and the path signal produced by the same, is ultimately also suitable for being converted into a velocity signal or acceleration signal by including a time measurement.

The measured path signal of the wire-rope sensor 21 is transmitted to an indicator device 20 and/or a controller 23 by means of a signal line 26. The indicator device 20 and/or the controller 23 receive measured path signals from each lifting column, as indicated in the drawing in FIG. 3. With a total of four existing lifting columns 14, four measured path signals can be displayed in the indicator device 20, so that the vehicle driver is immediately informed about the current lifting state of each lifting column and can alter the lifting position, if required.

The measured path signals can additionally be supplied to a controller 23, which enables overall control or regulation of the lifting position of the lifting columns 14.

The controller 23 can, for instance, adjust a desired lifting position of the lifting column 14 without overshooting or with as little overshooting as possible in accordance with the measured path signals of the measuring devices 18 and/or their alteration over time.

In case of a full-floating axle, floating can be effected purely hydraulically through piston cylinder units 16 which are provided with a piston capable of being loaded from two sides, and the counter-operating cylinder chambers of which are force-coupled with the corresponding cylinder chambers of the piston cylinder unit of a neighbouring wheel 10. Alternatively, a height adjustment in the manner of a full-floating axle may be effected with purely electronic control by means of the measured path signals detected.

The control or regulation may be such that, for instance, the machine frame 4 is subject to the smallest possible displacement.

The machine frame 4 may alternatively be regulated by means of the lifting state of the lifting columns 14 in such a manner that a pre-determined transverse inclination of the machine frame 4 transverse to the direction of travel is maintained.

A further alternative provides that the time sequence of the position of the machine frame 4 such as, for instance, a path-dependent transverse inclination sequence of the machine frame 4, may also be regulated by means of the measured path signals and the piston cylinder units 16 in combination with a path or machine position measurement.

Ultimately, it is also understandable that a longitudinal inclination or a combination of a transverse and longitudinal inclination can also be regulated by means of the controller 23.

The measured signals of the measuring device 18 may be calibrated to a unit of length like, for instance, millimetres. In this way, it is possible for the vehicle driver to also alter the lifting state of the lifting columns 14 through entering a specific stroke in millimetres.

Each lifting column 14 may be provided with a distance sensor 30 each at the supports 11, which measures the distance of the support 11 to the ground surface and traffic surface 24. By means of the measured signal of the distance sensors 30, and in combination with the measured path signals of the measuring device 18, the controller 23 for the lifting columns 14 can also calculate the current distance of the machine frame 4 from the ground surface and traffic surface 24.

The distance sensor 30 can measure the distance of the support 11 to the ground surface and traffic surface 24 also in a pre-determined distance in front of or next to the wheel 10 or crawler track unit. Measuring in front of the wheel 10 offers the possibility of using the measured signal of the distance sensor 30 for the purpose of controlling the height adjustment of the lifting columns 14 in a manner that allows an immediate reaction to any ground irregularity. Finally, the distance sensors 30 are also capable of supplying measured signals for a regulation of the milling depth, where the measured signals of the distance sensors 30 and the measured path signals of the measuring device 18 are evaluated on a joint basis.

Although a preferred embodiment of the invention has been specifically illustrated and described herein, it is to be understood that minor variations may be made in the apparatus without departing from the spirit and scope of the invention, as defined by the appended claims.

What is claimed is:

1. A road construction machine, comprising:
   a machine frame;
   a working drum supported from the machine frame for working a ground surface or traffic surface;
   a plurality of ground engaging supports for supporting the construction machine on the ground surface or traffic surface;
   a plurality of lifting columns, each one of the lifting columns being connected between the machine frame and one of the ground engaging supports, each one of the lifting columns including two telescoping hollow cylinders and at least one piston-cylinder unit located within the telescoping hollow cylinders for adjusting a height of the lifting column so that each one of the lifting columns is individually adjustable in height relative to the machine frame, each lifting column having a lifting position corresponding to a position of one of the two telescoping hollow cylinders relative to the other of the two telescoping hollow cylinders;
   a plurality of lifting position measuring devices, each lifting position measuring device being coupled with elements of one of the lifting columns, which elements are capable of being displaced relative to one another in accordance with the lifting position of the lifting column in such a manner that a path signal pertaining to the lifting position of the lifting column is continuously detectable by the measuring device; and
   a controller operably connected to the lifting position measuring devices to receive the path signals from the lifting position measuring devices, the controller being operable to regulate the lifting positions of the lifting columns in response to the path signals detected by the lifting position measuring devices.

2. The road construction machine of claim 1, further comprising:
   an indicator device operable to display the lifting positions of each of the lifting columns corresponding to the path signals detected by the lifting position measuring devices.

3. The road construction machine of claim 1, wherein:
   each of the lifting position measuring devices includes a wire-rope and a wire-rope sensor.

4. The road construction machine of claim 3, wherein:
   each of the wire-ropes is under tension and capable of being rolled up, and is connected to its respective lifting column such that the path signal pertaining to the lifting position of the lifting column is continuously detectable by the wire-rope sensor.

5. The road construction machine of claim 1, wherein:
   the controller is operable to define a reference plane relative to the ground surface or traffic surface, and the controller is operable to store measured signals from the lifting position measuring devices corresponding to current lifting positions of the lifting columns and to thereby define a current spatial position of the machine frame relative to the reference plane as a reference spatial position of the machine frame.

6. The road construction machine of claim 1, wherein:
   the controller is operable to adjust at least one limiting value for the height adjustment of each of the lifting columns, the at least one limiting value defining a highest and/or lowest lifting position of each of the lifting columns.

7. The road construction machine of claim 6, wherein:
   the limiting value for the height adjustment prevents engagement of a mechanical limit stop of the piston against the cylinder of the piston cylinder unit of each lifting column.

8. The construction machine of claim 1, wherein:
   the controller is operable to regulate the lifting positions of the plurality of lifting columns in such a manner that the machine frame has a predetermined transverse inclination relative to a ground surface or traffic surface and transverse to a direction of travel of the machine frame.

9. The construction machine of claim 8, wherein:
   the controller is operable to vary the transverse inclination of the machine frame in a pre-determined path-dependent transverse inclination sequence.

10. The road construction machine of claim 1, wherein:
    with the alteration of the lifting position and height of one of the lifting columns, a neighboring lifting column in transverse direction or longitudinal direction of the machine frame is adjusted in height in an opposite manner.

11. The road construction machine of claim 10, wherein:
    the height of the neighboring lifting column is adjusted by the same amount as the alteration of the height of said one of the lifting columns.

12. The road construction machine of claim 10, wherein:
    said one of the lifting columns and said neighboring lifting column are connected to two front ground engaging supports so that the lifting columns associated with front ground engaging supports are height-adjustable in the manner of a full-floating axle.

13. The road construction machine of claim 1, wherein:
the controller is operable to reduce overshooting in the adjustment of the lifting positions of the lifting columns with reference to desired lifting positions of the lifting columns.

14. The road construction machine of claim 1, wherein:
the controller and the measuring devices are operable to calibrate the lifting positions measured by the measuring devices to a unit of length.

15. The road construction machine of claim 1, wherein:
the controller is operable to regulate a working depth of the working drum at least in part in response to the path signals measured by the measuring devices.

16. The road construction machine of claim 1, wherein:
each of the lifting columns includes a lifting column support at a lower end of the lifting column, each lifting column support being attached to one of the ground engaging supports; and further comprising a plurality of distance sensors, one of said distance sensors being attached to each of the lifting column supports and arranged to measure a vertical distance of the lifting column support from the ground surface or traffic surface.

17. The road construction machine of claim 16, wherein:
each of the distance sensors is located relative to its associated lifting column support, so that the vertical distance is measured at a pre-determined horizontal position relative to its associated ground engaging support.

18. The road construction machine of claim 1, wherein:
each of the lifting position measuring devices is connected to the at least one piston-cylinder unit located within its associated lifting column.

19. The road construction machine of claim 1, wherein:
each of the lifting position measuring devices is connected between the two telescoping hollow members of its associated lifting column.

20. The road construction machine of claim 1, wherein:
the elements of the lifting column, which elements are capable of being displaced relative to one another in accordance with the lifting position of the lifting column, include the at least one piston-cylinder unit located within the lifting column.

21. The road construction machine of claim 1, wherein:
the elements of the lifting column, which elements are capable of being displaced relative to one another in accordance with the lifting position of the lifting column, include the two telescoping hollow members of the lifting column.

22. The road construction machine of claim 1, wherein:
the elements of the lifting column, which elements are capable of being displaced relative to one another in accordance with the lifting position of the lifting column, include one the two telescoping hollow members of the lifting column and an element of the at least one piston-cylinder unit located within the lifting column.

* * * * *